United States Patent [19]

Kestenbaum

[11] Patent Number: 4,560,961
[45] Date of Patent: Dec. 24, 1985

[54] METHOD AND MEANS FOR GENERATING PULSE COMPRESSION PULSES

[75] Inventor: William W. Kestenbaum, Lido Beach, N.Y.

[73] Assignee: Republic Electronics, Inc., Melville, N.Y.

[21] Appl. No.: 461,118

[22] Filed: Jan. 26, 1983

[51] Int. Cl.[4] .............................................. H03C 3/00
[52] U.S. Cl. ................................ 332/23 A; 332/16 R; 343/17.7
[58] Field of Search ............. 328/14; 332/16 R, 23 R, 332/23 A; 343/17.7; 434/2

[56] References Cited

U.S. PATENT DOCUMENTS

| 4,028,700 | 6/1977 | Carey et al. | 343/17.7 X |
| 4,039,806 | 8/1977 | Fredriksson et al. | 328/14 X |
| 4,195,300 | 3/1980 | Gouley | 343/17.7 X |
| 4,404,532 | 9/1983 | Welti | 332/23 R X |

FOREIGN PATENT DOCUMENTS

| 2361546 | 6/1974 | Fed. Rep. of Germany | 332/23 A |
| 2363214 | 7/1975 | Fed. Rep. of Germany | 332/23 A |
| WO81/36344 | 9/1981 | PCT Int'l Appl. | 332/16 R |
| 2069282 | 8/1981 | United Kingdom | 343/17.7 |

OTHER PUBLICATIONS

Rockland Systems Corp. Anonymous, "ROM Look-Up Generates Sine Wave in Frequency Synthesizer" Progress in Products, p. 45.

Primary Examiner—Eugene R. LaRoche
Assistant Examiner—Robert J. Pascal
Attorney, Agent, or Firm—Edward H. Loveman

[57] ABSTRACT

A system and method for generating phase/frequency coded pulses useful in radar and similar applications, (such as simulation of multiple return of targets) by generating frequency modulated pulse compression pulses rapidly with practically no time in between. Typically, the system simulates target returns as FM sweeps or chirps to obtain an echo of a transmitted pulse having a known signature. Digital circuits are employed with finite steps connected to a digital-to-analog converter driving a radio frequency balanced modulator, to produce the desired chirp output. The system generates FM phase modulations by reading two phase history records representing cosine and sine functions in phase quadrature of a to-be-transmitted pulse.

10 Claims, 1 Drawing Figure

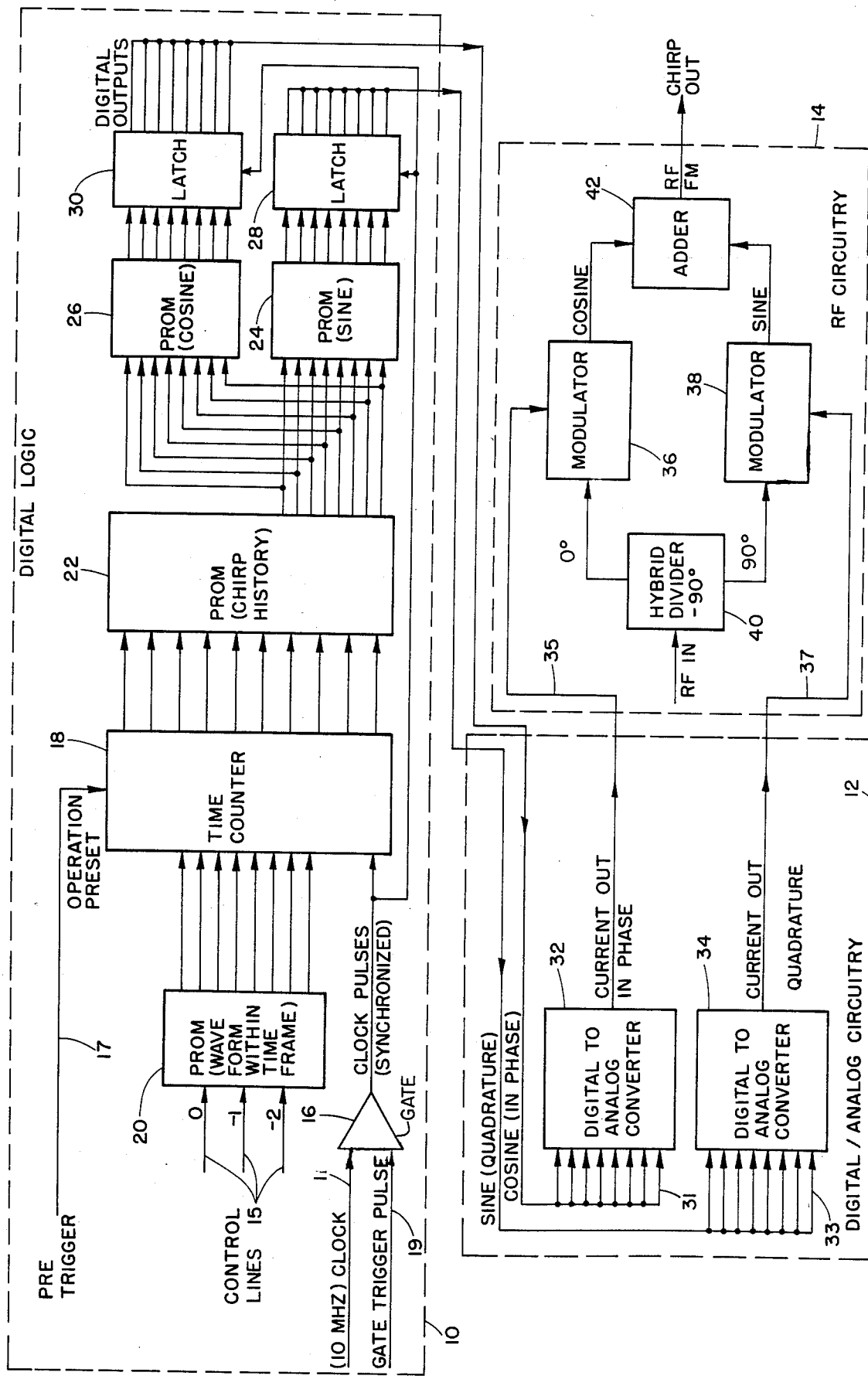

METHOD AND MEANS FOR GENERATING PULSE COMPRESSION PULSES

BACKGROUND OF THE INVENTION

1. Field of the Invention

This invention relates to the art of pulse compression circuits and more particularly concerns a pulse compression generator employing digital circuits with finite steps to generate continuous wave shapes, usable in radar and similar systems.

2. State of the Art

Heretofore pulse compression generators usable in radar systems have always used passive analog circuits having lumped parameter networks, very accurately tuned. These circuits include crystal filters, vacuum tubes, solid state amplifiers, and tuned networks of precision resistors, capacitors, and inductors. Two basic objections to the prior pulse generators, particularly those usable for obtaining a desired signal or simulating radar pulses, are their high cost and great complexity. A further objection is their inordinately large size and weight. A typical high quality precision compressed pulse generator of conventional type has hundreds of components, and costs about $70,000. It is over four feet in length and weighs many pounds.

3. Brief Summary of Invention

The present invention takes another approach. Here a lightweight, small, relatively inexpensive and simple unit uses a digital circuit feeding a digital-to-analog circuit which drives an R.F. balanced modulator circuit to produce desired FM sweeps or pulse compression pulses. FM pulses or "chirps" are generated continuously by first obtaining from a radar manufacturer or end user a phase history of frequencies as a function of time for transmitted radar pulses or a desired signal. That is, the phase is varied according to a prescribed system. It consists of amplitude modulating two carriers exactly 90° apart from each other, thereby generating one vector at 0° and 180° and a second vector at 90° and 270°. The two vectors are in phase quadrature. The phase addition of the two vectors gives the effect of rotating phase vector.

In the present embodiment of the invention, there is a single frequency reference source and a signal input applied to a 90° phase shifter which yields the two phases components in quadrature. Each of the two phase components are applied to a balanced amplitude modulator and then combined in an output adder to produce the desired output wave shape. The required phase information for the modulators is obtained by digital means. A time scale is generated on a digital counter, the output of which is a time variable address. This address is applied to a Programmable Read Only Memory (PROM) or a Read Only Memory (ROM) containing the desired phase history of the signal. The output of the PROM or ROM, as the case may be, in turn addresses two PROMS, a sine PROM and a cosine PROM, respectively, containing a conversion of the signal to the sine and cosine function thereof. The digital sine and cosine components are in phase quadrature, and are applied to two digital-to-analog converters. The converters convert the digital data to analog signals which appear as bipolar currents at the two converter outputs. These current outputs are applied to two balanced modulators along with a divided RF carrier. The modulator outputs in phase quadrature (sine and cosine) are then combined in an adder to produce the desired frequency modulated radio frequency signal. The system uses digital techniques including PROMS containing phase history with a resolution of the input to the sine and cosine thereof. The output from the PROMS is converted to analog and used to drive the modulators with quadrature RF to give the affect of a rotating vector after combination thereof.

4. Objects of the Invention

A principal object of the present invention is to obtain FM phase modulated sweeps or "chirps" as they are also known, which may simulate target returns in a radar system, i.e. echoes of known transmitted pulses, or pulses of a known signature.

A further object of the present invention is to maintain coherence, and that is, the pulse compression signal must have phase coherence with the original signal generated as a narrow pulse.

Still another object of the present invention is to provide for generation of FM or pulse compression returns rapidly one after the other with practically no time in between.

DESCRIPTION OF THE DRAWING

These and other objects and many of the attendant advantages of this invention will be readily appreciated as the same becomes better understood by reference to the following detailed description when considered in connection with the accompanying drawing in which the single FIGURE is a logic block diagram of a digital-/analog system embodying the invention.

DETAILED DESCRIPTION OF THE INVENTION

Referring now to the drawing, there is shown a system for generating pulse compression signals in which a digital logic circuit 10 feeds a digital/analog circuit 12 driving an RF circuit 14. In logic circuit 10, clock pulses 11 are applied via a gate 16 to a time counter 18. Gate trigger pulses 19 are applied to the gate 16 to synchronize and permit the clock pulses 11 to pass therethrough. The gated clock pulses 11 applied to the counter 18 advance the output of the counter 18 one step at a time. A plurality of control lines 15 establish the form of the address of a Programmable Read Only Memory (PROM) 20 and may also be used to select additional histories. That is, the control lines 15 permit moving or shifting the FM waveform within the envelope of the gate 16. The output from the PROM 20 presets the counter 18 to a selected count when a pretrigger 17 is applied to the counter 18. One pretrigger signal 17 must precede each gate signal 19.

Thus, when the gate trigger pulse 19 is applied to the counter 18 through gate 16, it produces addresses applied to a PROM 22 where the radar chirp phase history is stored in digital form; that is, in a multibit word, for example, 8 bits. Depending on the timing of clock 11 the PROM 22 will advance and read out the phase history. This word is translated to a pair of PROMS 24 and 26 which convert the phase history into sine and cosine functions which are in phase quadrature with respect to each other. By phase quadrature, it means that when one signal is at a maximum, the other signal will be at zero. The digital sine and cosine data lines are applied from the PROMS 24 and 26, via a pair of respective latches 28 and 30 to the digital to analog circuit 12. The latches 28 and 30 actuated by the output of the gate 16 prevent passage of data while the signals from the PROMS are in transit.

The digital cosine component ("in phase") is applied via eight lines 31 to a digital-to-analog converter 32. The digital sine component ("quadraturephase") is applied via lines 33 to a digital-to-analog converter 34. The converters 32, 34 produce respectively "in-phase" and "quadrature-phase" analog currents which are applied via lines 35 and 37 respectively to respective balanced modulators 36 and 38 of the RF circuit 14. The currents are in phase quadrature. An RF carrier is applied via a hybrid divider 40 to the modulators 36, 38 which produce sine and cosine signal modulation of the carrier. These signals are applied to an in-phase adder 42 where the signals are combined to produce a continuous frequency modulated RF wave shape or chirp.

To summarize, system operation starts with the pretrigger 17 which presets the counter 18. Then, the gate trigger pulses 19 allows the counter 18 to run. The signal input is translated into a phase history in the PROM 22. The phase history is converted to in-phase (cosine) and quadrature (sine) components by PROMS 26, 24 respectively. These digital outputs are applied to respective digital-to-analog circuits 34, 32 which generate analog currents. The analog currents in quadrature with each other are applied to the balanced modulators 36, 38 and the modulated voltages in quadrature are combined in the adder 42 to produce the desired chirp output.

It should be understood that if desired, the in phase signal in PROM 22 may include the sine, cosine history, and in that event, the output from PROM 22 would be applied directly to the latches 28 and 30 respectively.

In view of the foregoing, it will be apparent that the system produces an unexpected and unobvious result, in that digital circuits with finite steps generate linear differential phase shifts as a function of frequency input. The digital circuit operates in association with digital-to-analog converters and the RF modulator circuit to generate continuous wave shapes. By contrast, in the prior art, only analog circuits were used to generate continuous wave shapes. These prior analog circuits use lumped parameter networks, crystal filters, vacuum tube amplifiers, crystal amplifiers, etc . . . . Everything had to be tuned precisely and precision components had to be used throughout.

The present system can be fabricated in miniature form using conventional components. From components manufactured for example, the PROMS by Texas Instrument's PROM Model Nos. TBP 18S030, TBP 18S22, and TBP28L22; Texas Instrument's Counter such as Model No. SN54LS191 and a Latch such as Texas Instrument's Model No. 54LS378 or 54LS379. The digital-to-analog converters may be manufactured by Analog Devices, their Model No. 620 DAC1106 and the RF circuit components manufactured by Minicircuit, modulator Model No. ZAD-1, their adder Model No. Z3C 2-1, and their hybrid divider Model No. ZSCQ-2-50. In addition to Texas Instruments, other manufacturers of PROMS include Intell with their Model 3636 and Intersil with their Model IM5600. The gate 16 is a conventional and logic gate manufactured by enumerable electronic companys. The system can be produced at less than 1% of the cost of prior analog circuitry, yet it will provide superior results.

It should be understood that the foregoing relates to only a preferred embodiment of the invention which has been by way of example only, and that it is intended to cover all changes and modifications of the examples of the invention, herein chosen for the purpose of the disclosure, which do not constitute departures from the spirit and scope of the invention.

What is claimed is:

1. A system for producing a phase and frequency modulated signal corresponding in frequency and phase to a phase history of a desired signal comprising:
    a digital means for producing two digital components representing respectively sine and cosine functions corresponding to a phase angle of said phase history of said desired signal;
    a digital-to-analog circuit arranged to receive said digital components and to translate the same into two analog currents respectively corresponding to said sine and cosine functions; and
    an analog circuit arranged to modulate RF signals in response to said two analog currents and to add the modulated RF signals to produce a constant amplitude signal having a frequency and phase corresponding to said desired signal.

2. A system as defined in claim 1, wherein said digital means comprises a time counter for generating a time scale and producing an output which is a time variable address; and
    a first PROM connected to said counter to receive said address and read out said two digital components representing said sine and cosine functions corresponding to said phase history.

3. A system as defined in claim 2, wherein said time counter includes a pretrigger and said digital means includes a second PROM connected to said time counter for shifting said time variable address, in response to said pretrigger.

4. A system as defined in claim 2, wherein said first PROM further comprises a third and fourth PROM for respectively generating said two digital components representing said sine and cosine functions corresponding to said phase angle of said phase history, the addresses of said third and fourth PROMS being produced by said first PROM from said time variable address.

5. A system as defined in claim 2, wherein said digital-to-analog circuit comprises two digital-to-analog converters respectively connected series to said first PROM.

6. A system as defined in claim 4, wherein said digital-to-analog circuit comprises two digital-to-analog converters respectively connected series to said third and fourth PROMS;
    said converters having inputs respectively receiving said two digital components generated by said third and fourth PROMS;
    said converters having current outputs respectively corresponding to said sine and cosine functions.

7. A system as defined in claim 5, wherein said analog circuit comprises two modulators each having an input connected respectively to a different one of said two converters;
    a source of a radio frequency carrier connected to other inputs of said two modulators, said modulators having modulated current outputs corresponding to said sine and cosine functions; and
    an adder connected to said outputs of said modulators to add said modulated current outputs, said adder producing as an output said constant amplitude signal.

8. A system as defined in claim 6, wherein said analog circuit comprises two modulators each having an input connected respectively to a different one of said two converters;

a source of a radio frequency carrier connected to other inputs of said two modulators, said modulators having modulated current outputs corresponding to said sine and cosine functions; and an adder connected to said outputs of said modulators to add said modulated current outputs, said adder producing as an output said constant amplitude signal.

9. A system as defined in claim 7, wherein said source of radio frequency carrier is applied to a 90° two-way divider having two radio frequency outputs connected respectively to said other inputs of said two modulators.

10. A system as defined in claim 8, wherein said source of radio frequency carrier is applied to a 90° two-way divider having two radio frequency outputs connected respectively to said other inputs of said two modulators.

* * * * *